US008856376B1

(12) United States Patent
Watson et al.

(10) Patent No.: US 8,856,376 B1
(45) Date of Patent: Oct. 7, 2014

(54) STABILIZATION TOOL FOR A HIGH-CAPACITY NETWORK INFRASTRUCTURE

(75) Inventors: David J. Watson, Greer, SC (US); Eric M. Ellington, Charlotte, NC (US); Matthew J. Doring, Clover, SC (US); Catherine A. Diemer, Charlotte, NC (US); Michael J. Ragunas, Weddington, NC (US)

(73) Assignee: Bank of America Corporation, Charlotte, NC (US)

( * ) Notice: Subject to any disclaimer, the term of this patent is extended or adjusted under 35 U.S.C. 154(b) by 1119 days.

(21) Appl. No.: 12/338,320

(22) Filed: Dec. 18, 2008

(51) Int. Cl.
*G06F 15/16* (2006.01)
*G06F 15/167* (2006.01)
*G06F 15/173* (2006.01)
*G06F 11/00* (2006.01)
*H04W 4/00* (2009.01)

(52) U.S. Cl.
USPC ........... 709/232; 709/201; 709/203; 709/206; 709/217; 709/219; 709/223; 709/224; 709/226; 709/227; 709/229; 370/230; 370/252; 370/329; 370/389; 370/390; 370/392; 370/401

(58) Field of Classification Search
None
See application file for complete search history.

(56) References Cited

U.S. PATENT DOCUMENTS

| | | | |
|---|---|---|---|
| 6,173,334 B1 * | 1/2001 | Matsuzaki et al. | 709/245 |
| 6,259,705 B1 * | 7/2001 | Takahashi et al. | 370/465 |
| 6,412,077 B1 * | 6/2002 | Roden et al. | 714/4 |
| 6,519,643 B1 * | 2/2003 | Foulkes et al. | 709/227 |
| 6,741,576 B1 * | 5/2004 | Alimi et al. | 370/329 |
| 6,954,651 B2 * | 10/2005 | Yamato | 455/509 |
| 7,058,704 B1 * | 6/2006 | Mangipudi et al. | 709/223 |
| 7,152,111 B2 * | 12/2006 | Allred et al. | 709/227 |
| 7,216,164 B1 * | 5/2007 | Whitmore et al. | 709/224 |
| 7,237,239 B1 * | 6/2007 | Goel et al. | 717/170 |
| 7,272,662 B2 * | 9/2007 | Chesnais et al. | 709/246 |
| 7,287,082 B1 * | 10/2007 | O'Toole, Jr. | 709/228 |
| 7,433,962 B2 * | 10/2008 | Janssen et al. | 709/235 |
| 7,640,293 B2 * | 12/2009 | Wilson et al. | 709/203 |
| 7,676,749 B2 * | 3/2010 | Tobe | 715/741 |
| 7,729,699 B2 * | 6/2010 | Kusaki et al. | 455/436 |
| 7,746,774 B2 * | 6/2010 | Xue et al. | 370/230 |
| 7,870,200 B2 * | 1/2011 | Slater et al. | 709/206 |
| 7,873,695 B2 * | 1/2011 | Clegg et al. | 709/206 |
| 7,940,761 B2 * | 5/2011 | Umesawa et al. | 370/389 |
| 8,224,963 B2 * | 7/2012 | Tsunogai | 709/227 |
| 8,347,286 B2 * | 1/2013 | Campbell et al. | 717/178 |
| 8,554,929 B1 * | 10/2013 | Szeto et al. | 709/229 |

(Continued)

*Primary Examiner* — Ario Etienne
*Assistant Examiner* — Ho Shiu
(74) *Attorney, Agent, or Firm* — Michael A. Springs; Moore & Van Allen PLLC; F. Emmett Weindruch

(57) ABSTRACT

Embodiments of the present invention are directed to a system and method to stabilize high-capacity network infrastructures by monitoring and regulating concurrent connections between a server and various service provider systems in a network. Based on the attributes of the concurrent connections, the connections are logically grouped to form adapters that represent particular combinations of connection attributes. The concurrent connections to an adapter are monitored and regulated to help identify failing components and to manage the load on the network through the use of autonomic computing to optimize network performance and automatically adapt to changing conditions. The regulation of the concurrent connections to an adapter includes the calculation and assignment of a timeout value to new connections to make certain that service provider system response times are low in terms of a success or failure to respond in a timely fashion.

26 Claims, 5 Drawing Sheets

(56) References Cited

U.S. PATENT DOCUMENTS

| | | | |
|---|---|---|---|
| 2002/0002611 A1* | 1/2002 | Vange | 709/223 |
| 2002/0099831 A1* | 7/2002 | Tsunogai | 709/227 |
| 2003/0131073 A1* | 7/2003 | Lucovsky et al. | 709/219 |
| 2004/0215703 A1* | 10/2004 | Song et al. | 709/201 |
| 2005/0088976 A1* | 4/2005 | Chafle et al. | 370/252 |
| 2005/0091388 A1* | 4/2005 | Kamboh et al. | 709/228 |
| 2005/0182838 A1* | 8/2005 | Sheets et al. | 709/226 |
| 2006/0161554 A1* | 7/2006 | Lucovsky et al. | 707/10 |
| 2006/0265235 A1* | 11/2006 | Schuchardt et al. | 705/1 |
| 2007/0266045 A1* | 11/2007 | Bansal et al. | 707/104.1 |
| 2007/0266149 A1* | 11/2007 | Cobb et al. | 709/224 |
| 2008/0075085 A1* | 3/2008 | Tsuge et al. | 370/392 |
| 2008/0170579 A1* | 7/2008 | Chafle et al. | 370/401 |
| 2009/0077233 A1* | 3/2009 | Kurebayashi et al. | 709/224 |
| 2009/0125632 A1* | 5/2009 | Purpura | 709/229 |

* cited by examiner

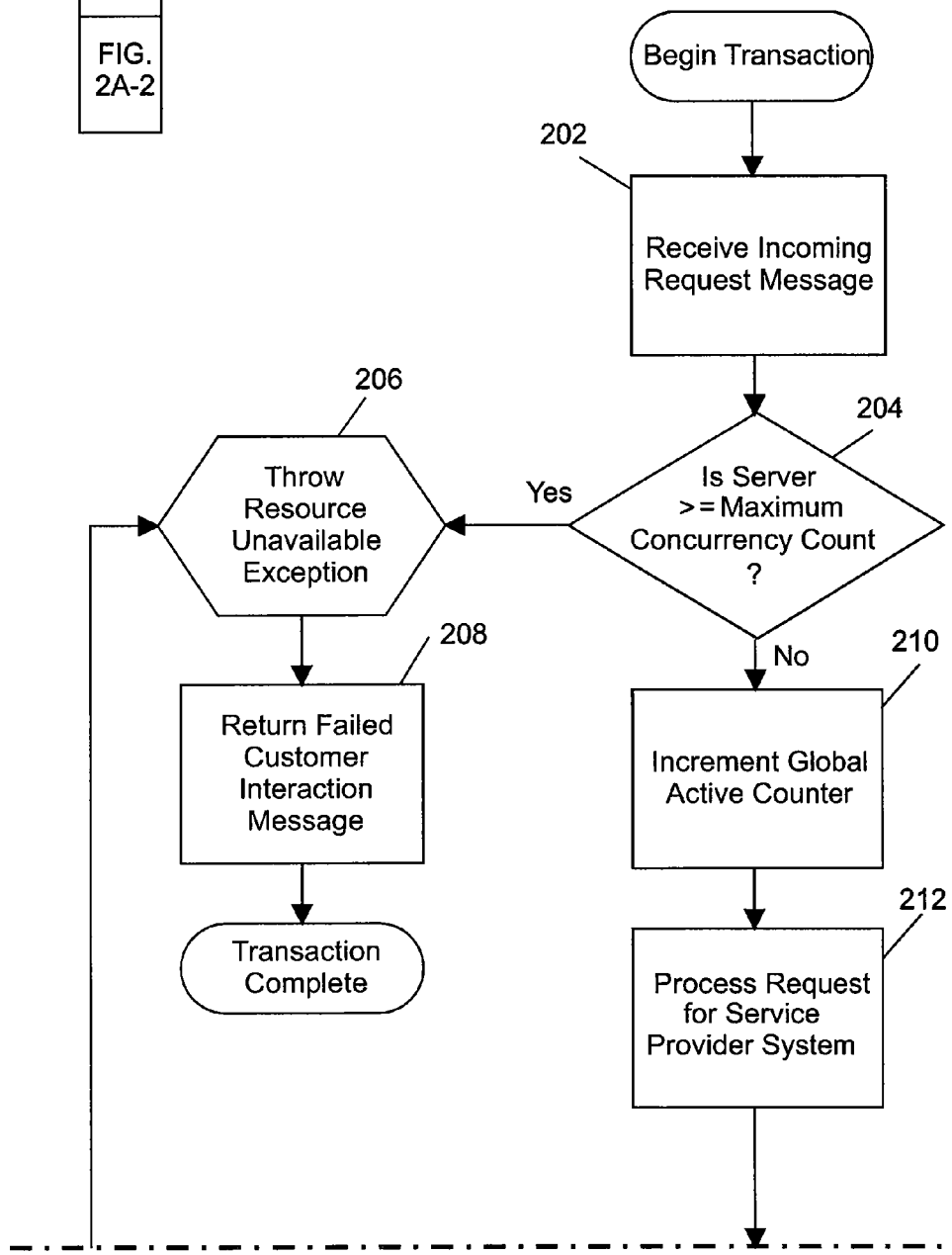

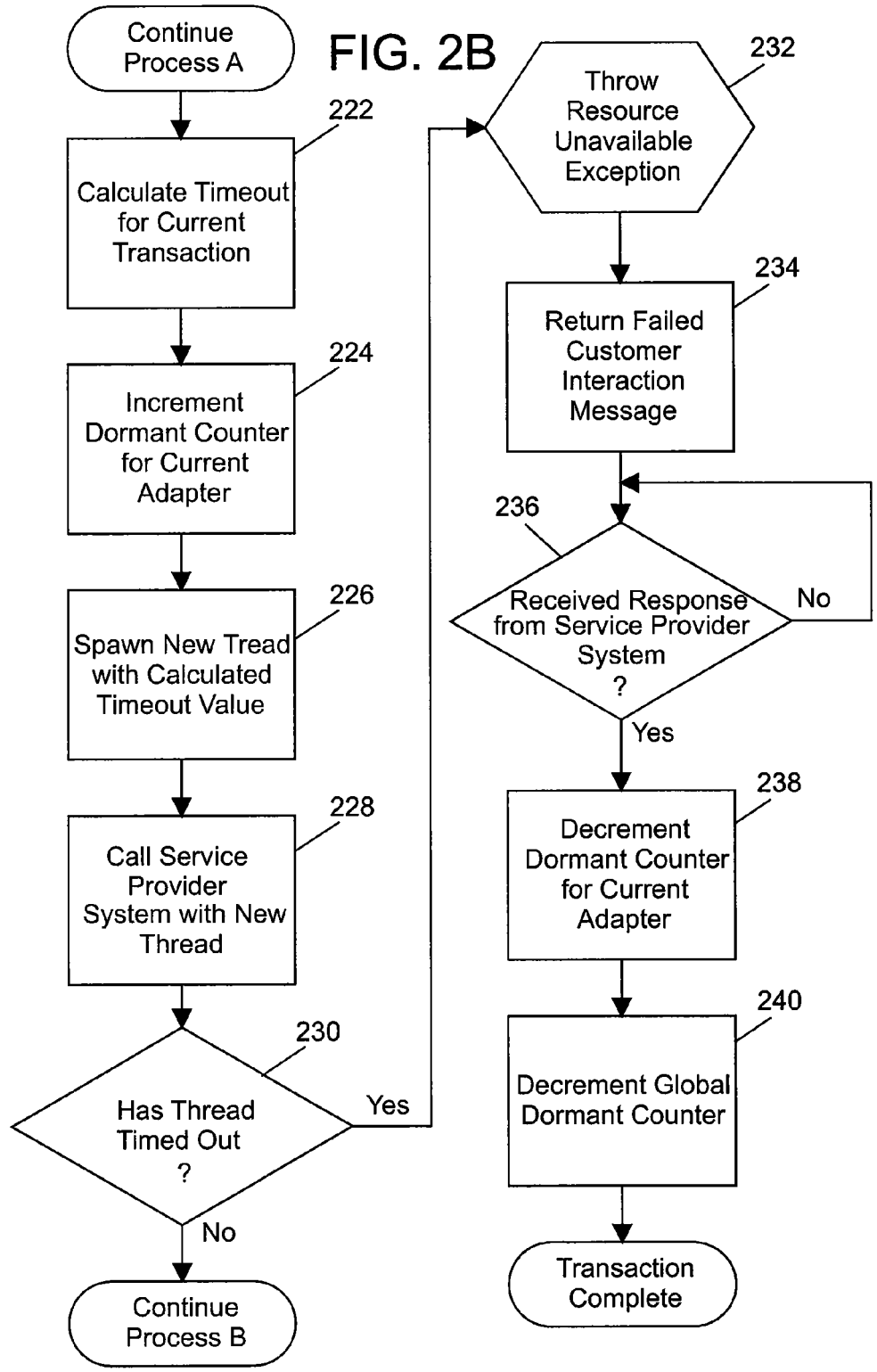

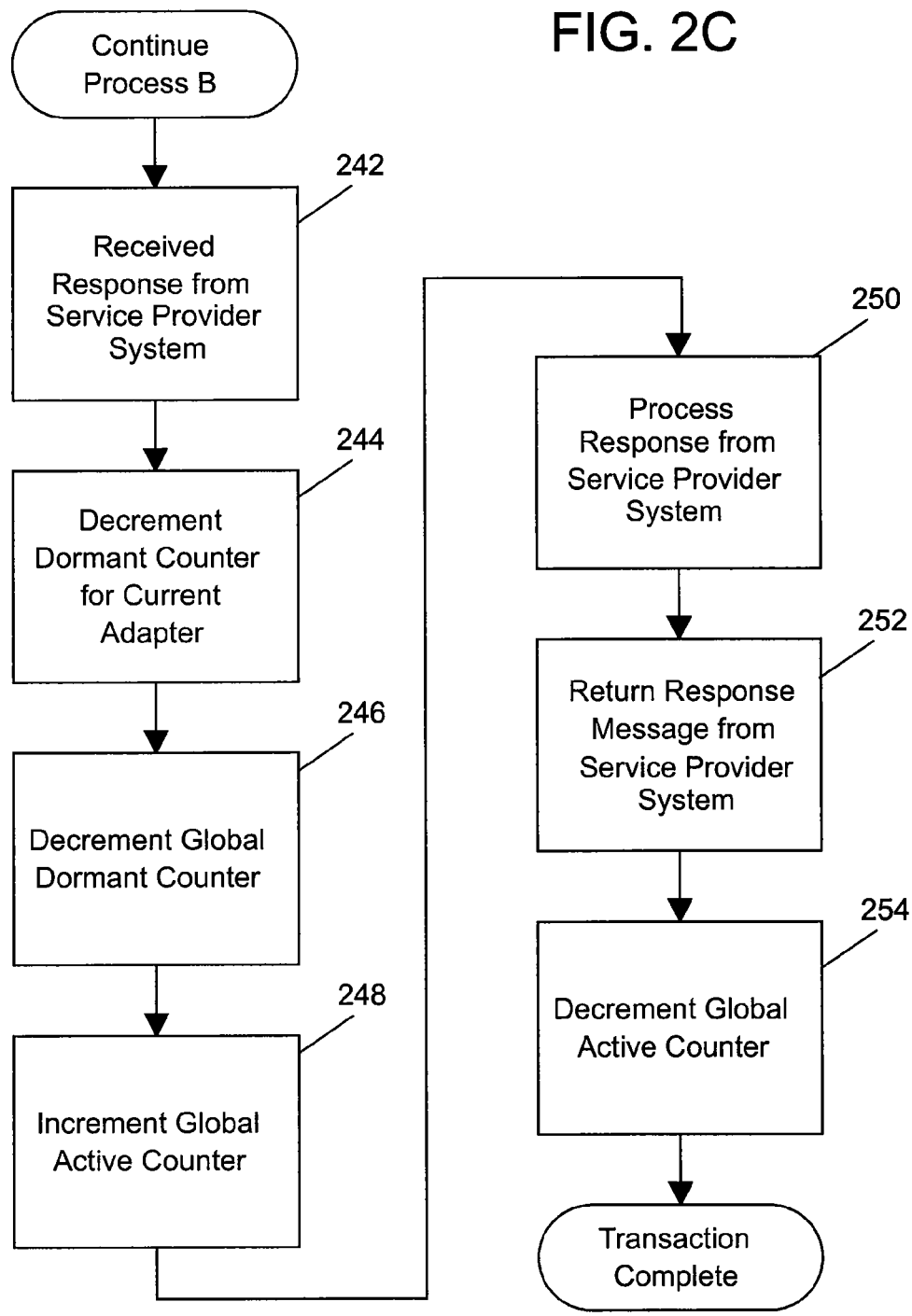

STABILIZATION TOOL FOR A HIGH-CAPACITY NETWORK INFRASTRUCTURE

BACKGROUND

Information regarding a customer and the customer's account may be stored in a variety of formats using various software applications on numerous computer systems throughout an organization's network. The computer systems may be located at one or more geographic locations. The computer systems may be owned and operated by the organization, or the organization may procure a vendor for certain responsibilities and functions Customers and others make use of this information by conducting transactions in which the information is retrieved, accessed, modified, deleted, or stored. For large organizations, millions of these transactions may take place every day resulting in numerous connections occurring at the same time between various software applications and computer systems in a network. These concurrent connections are handled by servers within the network that process and convert the information into a format that can be utilized by the various software applications and computer systems.

Hardware and software components within the organization's network can fail for a wide variety of reasons. A failure of one software application or computer system can impact a wide variety of transactions across an organization's network causing delays, overloading, and additional failures. Therefore, when a failure occurs, it is imperative that the organization minimize any impact the failure may have on its customers and others.

What is needed is a stabilization tool for a high-capacity network infrastructure to protect the network through the early detection of failing conditions and the implementation of proactive measures to minimize the impact of any failures and to eliminate collateral damage to customers whose transactions do not involve the use of the software applications and/or computer systems that are experiencing a failing condition.

SUMMARY

Embodiments of the present invention are directed to a system and method to stabilize high-capacity network infrastructures by monitoring and regulating concurrent connections between a server and various service provider systems in a network. Based on the attributes of the concurrent connections, the connections are logically grouped to form adapters that represent particular combinations of connection attributes. The concurrent connections to an adapter are monitored and regulated to help identify failing components and to manage the load on the network through the use of autonomic computing to optimize network performance and automatically adapt to changing conditions. The regulation of the concurrent connections to an adapter includes the calculation and assignment of a timeout value to new connections to make certain that service provider system response times are low in terms of a success or failure to respond in a timely fashion.

In some embodiments, when a transaction request is received by a server, a new concurrent connection is created to an adapter to execute the transaction request if a new concurrent connection is allowed. A new concurrent connection to an adapter is allowed if the number of current concurrent connections to the adapter is less than a maximum number of concurrent connections permitted for the adapter. If a new concurrent connection is allowed, a timeout value to receive a response to the transaction request is calculated and then assigned to the new concurrent connection. If a response is not received to the transaction request before the timeout value expires, the transaction request will fail.

In exemplary embodiments of the invention, a system implementing the invention includes an execution system configured to execute and respond to transaction requests. The system also includes a processing system connected to the execution system that is configured to monitor and regulate the concurrent connections to an adapter, where the adapter represents a particular combination of connection attributes. The processing system is also configured to create a new concurrent connection to an adapter to execute a transaction request and to calculate and assign a timeout value to the new concurrent connection to receive a response to the transaction request from the execution system.

BRIEF DESCRIPTION OF THE DRAWINGS

FIGS. 2A, 2B, and 2C are flowchart diagrams illustrating one embodiment of the stabilization tool for a high-capacity network infrastructure for performing the present invention.

DESCRIPTION

Figure 1:
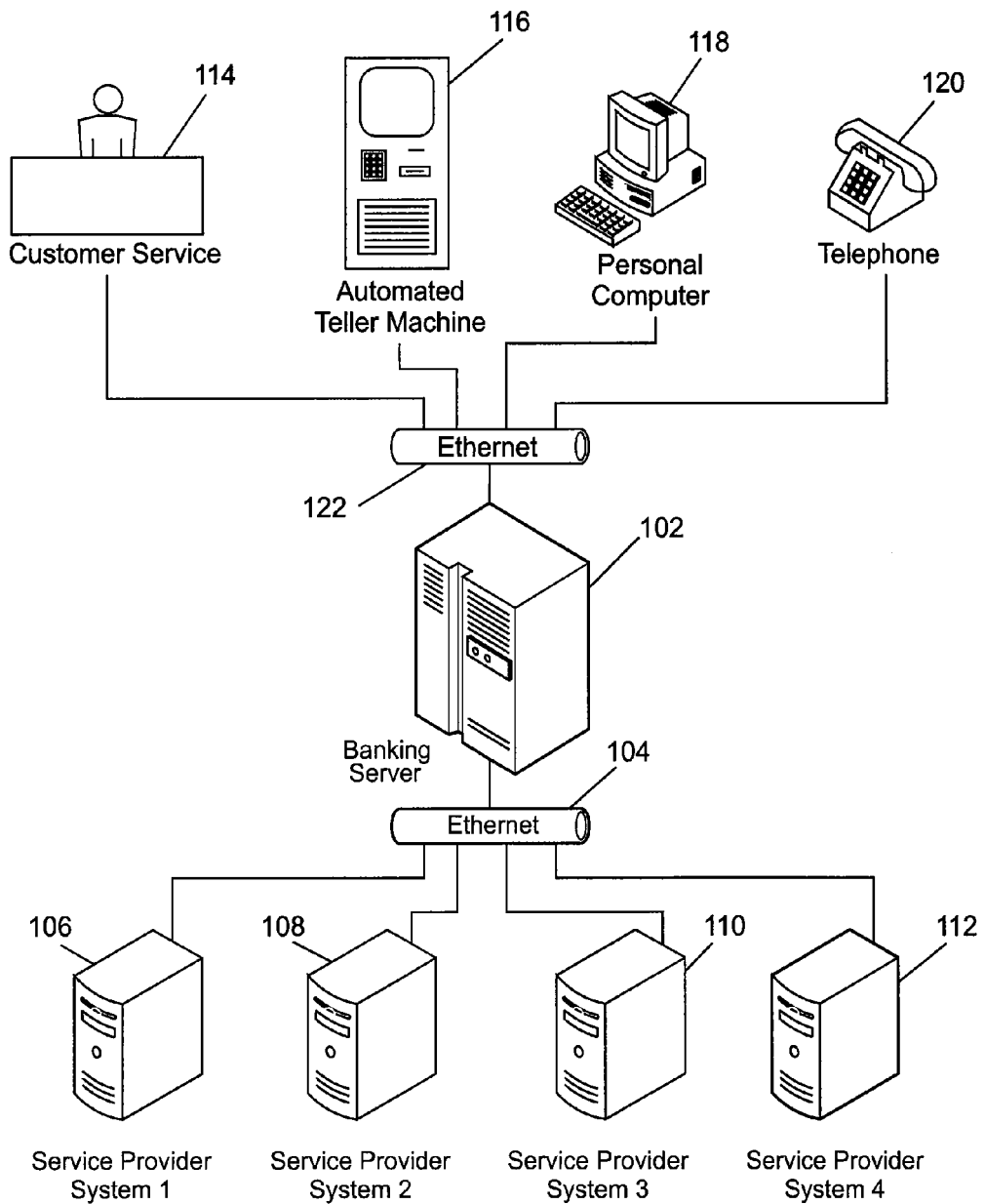
FIG. 1 is a system block diagram of one embodiment of the stabilization tool for a high-capacity network infrastructure.

The following detailed description of embodiments refers to the accompanying drawings, which illustrate specific embodiments of the invention. Other embodiments having different structures and operation do not depart from the scope of the present invention.

As will be appreciated by one of skill in the art, the present invention may be embodied as a method, system, computer program product, or a combination of the foregoing. Accordingly, embodiments of the present invention may take the form of an entirely hardware embodiment, an entirely software embodiment (including firmware, resident software, micro-code, etc.), or an embodiment combining software and hardware aspects that may generally be referred to herein as a "system." Furthermore, embodiments of the present invention may take the form of a computer program product on a computer-usable storage medium having computer-usable program code embodied in the medium.

Any suitable computer-usable or computer-readable medium may be utilized. The computer-usable or computer-readable medium may be, for example, but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires; a tangible medium such as a portable computer diskette, a hard disk, a random access memory (RAM), a read-only memory (ROM), an erasable programmable read-only memory (EPROM or Flash memory), a compact disc read-only memory (CD-ROM), or other optical or magnetic storage device; or transmission media such as those supporting the Internet or an intranet. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer-usable program code may be transmitted using any appropriate medium, including but not limited to the Internet, wireline, optical fiber cable, radio frequency (RF), or other means.

Computer program code for carrying out operations of the present invention may be written in an object-oriented, scripted, or unscripted programming language such as Java, Perl, Smalltalk, C++ or the like. However, the computer program code for carrying out operations of the present invention may also be written in conventional procedural programming languages, such as the "C" programming language or similar programming languages.

Embodiments of the present invention are described below with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process, such that the instructions which execute on the computer or other programmable apparatus provide steps for implementing the functions/acts specified in the flowchart and/or block diagram block or blocks. Alternatively, computer program implemented steps or acts may be combined with operator or human implemented steps or acts in order to carry out an embodiment of the invention.

The term "bank" and any similar terms are used herein in their broadest sense. Financial institutions that process transactions of the types discussed can include credit unions, savings and loan associations, stock brokerages, asset management firms, and other types of institutions which are not strictly banks in the historical sense. Retail, wholesale, and service businesses, as well as manufacturers, may also process transactions as disclosed herein. The use of terms such as "bank" or "institution" herein is meant to encompass all such possibilities.

For purposes of an example relative to the embodiments of the invention presented herein, it can be assumed that the account being discussed is a banking account at a financial institution. The term "account" is used herein in its broadest sense. Institutions, organizations, and corporations that maintain various types of accounts are widely varied in their organization and structure, as well as are the accounts themselves. These terms are intended to encompass all possibilities, including, but not limited to, banks, credit unions, savings and loan associations, stock brokerages, asset management firms, finance companies, credit card companies, utility companies, mortgage companies, manufacturers, retail establishments, download services, and online auctions.

FIG. 1 illustrates a system block diagram of one embodiment of the stabilization tool for a high-capacity network infrastructure. Banking server 102 is a transaction server. The banking server 102 carries out the task of monitoring, regulating, and processing transaction requests made by various users. The banking server 102 may be referred to in this embodiment as the "processing system" of the invention. Computer program instructions to implement the various functions of embodiments of the invention reside partly in the memory of banking server 102 when it is in operation. When the system is not in operation, the instructions typically reside on a fixed magnetic disk. The computer program instructions may also be stored on portable media such as a CD-ROM, tape cartridge, or removable magnetic disk.

The banking server 102 is connected via an Ethernet local area network (LAN), 104, to service provider system 1, 106, service provider system 2, 108, service provider system 3, 110, and service provider system 4, 112. These service provider systems are computer systems that run software applications that process information used for various purposes by the bank. A service provider system may have one or more software applications that are loaded in the memory of the service provider system and executed by its processor. The software applications may be used to accomplish any number of tasks including, for example, checking a customer's account balance or changing the customer's name or address. The information on the service provider system may be stored on a fixed magnetic disk in an industry standard format, proprietary format, or other format. The information may also be stored in a data warehouse that can be accessed by the service provider system. For the purpose of illustration, the service provider systems are connected via an Ethernet LAN; however, as would be known and easily understood by one skilled in the art, the service provider systems may be in one or more locations and may be connected to banking server 102 via an intranet or the Internet. As is the case with most businesses, various security measures, such as an Internet firewall (not shown), may also be used to protect and prevent unauthorized access to the network and computer systems.

When a customer needs to perform a task such as checking the customer's account balance, several options are available to enable the customer to accomplish the task, and these options are represented in FIG. 1 as customer service 114, automated teller machine 116, personal computer 118, and telephone 120. These options may be referred to as channels of communication or data channels. The customer may contact customer server 114 and request that a customer service representative provide the current account balance. The customer service representative would then initiate a transaction request typically using a computer to obtain this information for the customer. As an alternative method of accomplishing the task, the customer could use automated teller machine 116 to initiate a transaction request to obtain the current account balance. Another option may be for the customer to initiate a transaction request using personal computer 118 to access the customer's account via the Internet using the bank's online banking website. The customer may also initiate a transaction request by using telephone 120 to access the customer's account through the bank's telephonic audio-response system.

For the purpose of illustration, the data channels discussed above are shown as being connected to banking server 102 via an Ethernet local area network (LAN) 122. However, as one of ordinary skill in the financial and computing arts would easily recognize, additional hardware, software, and other components may be necessary to interface each data channel with banking server 102, and each data channel may also be connected to banking server 102 via an intranet or the Internet. Various security measures, such as an Internet firewall (not shown), may also be used to protect and prevent unauthorized access to the banking server and network.

Note that the present invention is not limited to the particular data channels or tasks described above. Any number of data channels may be available to enable a user to initiate a transaction request to carry out a particular task. Similarly, any number of tasks may be performed that utilize one or more of the software applications that run on the service provider systems described above to process information.

After a transaction request is initiated using one of the data channels, the transaction request is received by banking server 102 and is then sent to the appropriate service provider system 106, 108, 110, or 112 for execution by a software application on the service provider system. The service provider systems may be referred to in this embodiment as the "execution system" of the invention. To enable the software application to execute the transaction request, the request must be formatted and communicated to the service provider system in a manner that can be utilized by the software application. This conversion of the transaction request is done by computer software on banking server 102 that is commonly referred to as middleware. Middleware is computer software that connects two or more software applications allowing them to exchange information or data. The webMethods product suite provided by Software AG is an example of a middleware solution. The middleware is loaded in the memory of banking server 102 and is executed by its processor. In this embodiment of the invention, the middleware enables the communication and exchange of information between the data channels and the service provider systems.

Each transaction request from a data channel to a service provider system involves the creation of a new connection from the data channel to banking server 102. Banking server 102 handles many transaction requests simultaneously which creates a larger number of concurrent connections. If banking server 102 has too many concurrent connections, it can become overloaded resulting in poor performance or the failure of various hardware and/or software components. Therefore, the number of concurrent connections to banking server 102 is monitored and regulated to avoid these potential problems. In this embodiment of the invention, a "governor" is used to accomplish this task and to manage the banking server's available resources. The governor is computer software that controls the number of concurrent connections that may be handled at the same time by banking server 102. The maximum number of concurrent connections that a server can handle is determined through performance testing prior to using the server on the network. The performance testing typically involves, among other things, applying a load on the server to determine its maximum capacity. The maximum number of concurrent connections may vary from server to server depending on the actual computer system being used and its hardware and software configuration.

When a transaction request is sent by banking server 102 to the appropriate service provider system 106, 108, 110, or 112 for execution, a new connection is created from banking server 102 to the service provider system. Depending on the nature of the transaction request, multiple connections may be necessary in order to complete the transaction. For example, a transaction request to provide the account balance for one account may only require one new concurrent connection. However, a transaction request to provide the account balance for multiple accounts may require multiple new concurrent connections.

While a governor is used in this embodiment of the invention to monitor and regulate the concurrent connections between the data channels and banking server 102, there are numerous hardware and software components across a network that can fail at any time potentially causing other problems throughout the network. Therefore, it is important to try and identify any components that may be failing as quickly as possible to avoid these problems.

In this embodiment of the invention, attributes of various connections, referred to as connection attributes or keys, are selected and combined into particular combinations of connection attributes. These combinations of connection attributes are referred to as adapters or key combinations. The following are examples of connection attributes: the service provider system being utilized, the software application executing the transaction request on the service provider system, the region of the country where the software application is running, and the network protocol used for the connection. In this embodiment of the invention, the concurrent connections to an adapter are monitored and regulated to help identify failing components and to manage the load on the network through the use of autonomic computing to optimize network performance and automatically adapt to changing conditions. As would be easily understood by one skilled in the art, any number of connection attributes and combinations of those attributes may be used to implement this invention.

For the purpose of illustration, CDAT.NAA.0000.TCP may be used to identify an adapter having a particular combination of connection attributes. CDAT indicates that the connection is utilizing the Customer Data service provider system; NAA indicates that the Name and Address software application is executing the transaction request; 0000 indicates that the software application is running in the Eastern region; and TCP indicates that the connection is using the TCP/IP network protocol. A second adapter CDAT.NAA.0001.TCP is similar to the first adapter CDAT.NAA.0000.TCP; however, the use of 0001 instead of 0000 in the adapter name indicates that the Name and Address software application is running in the Midwest region instead of the Eastern region. If a problem occurs with adapter CDAT.NAA.0000.TCP that is not occurring with adapter CDAT.NAA.0001.TCP, it may indicate that there is a problem running the NAA software application in the Eastern region. As would be easily understood by one skilled in the art, this information may then be used to help identify and isolate problems to avoid failing components and make any necessary corrections and/or repairs.

FIG. 1 illustrates a system block diagram of one embodiment of the stabilization tool for a high-capacity network infrastructure. A complex network for a large organization may have many transaction servers similar to banking server 102 that process millions of transaction requests from numerous data channels located around the world, and the transactions servers may interface with service provider systems located in numerous locations. The ability to monitor and regulate various concurrent connections in a complex network helps to protect the network through the early detection of failing conditions, it minimizes the impact of any failures, and it helps eliminate collateral damage to other users whose transactions do not involve the software applications and/or computer systems currently experiencing the failing condition.

Figures 2, 2A:
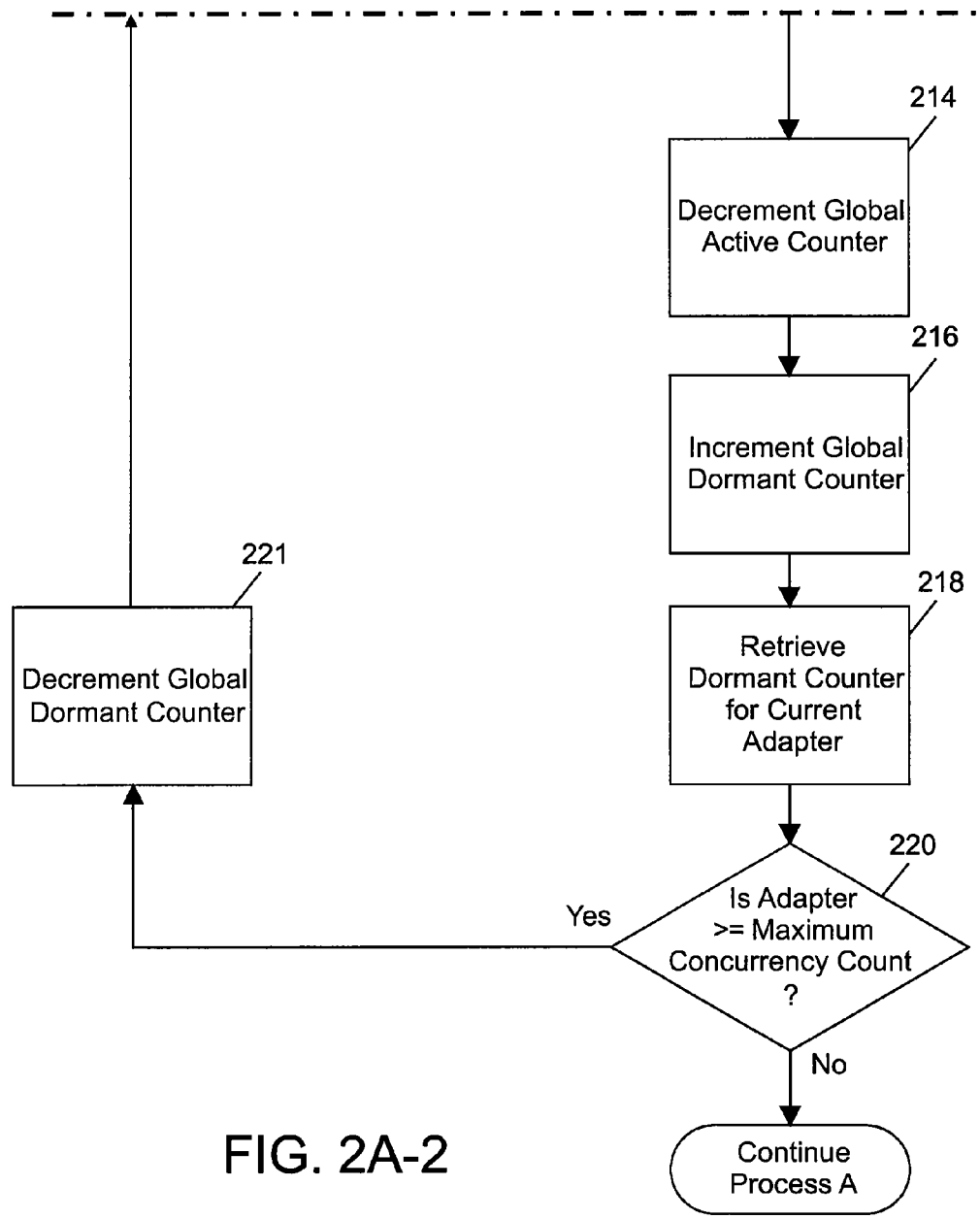

FIGS. 2A, 2B, and 2C are flowchart diagrams illustrating one embodiment of the stabilization tool for a high-capacity network infrastructure for performing the present invention. The process begins in FIG. 2A at block 202 when an incoming request message in the form of a transaction request is received by the banking server (see FIG. 1) from a data channel. The process continues at block 204 where a determination is made whether the current number of concurrent connections on the banking server is greater than or equal to a maximum number of concurrent connections allowed for the banking server. As discussed previously, the governor controls the number of concurrent connections that may be handled at the same time by the banking server. In this embodiment of the invention, the governor's primary processes are illustrated in blocks 202 through 210.

The maximum number of concurrent connections that a server can handle is determined through performance testing prior to using a server on the network. A server may have active connections where a transaction request or a response to the transaction request is currently being processed by the middleware on the server. The server may also have dormant connections where the transaction request has been processed and sent to the appropriate service provider system; however, a response has not yet been received from the service provider system. The maximum number of concurrent connections will include both the number of active connections and the number of dormant connections. Since the dormant connections are not currently using the server's resources, a much larger number of dormant connections may be allowed than active connections. For example, the maximum number of active connections for a given server may be 16 while the number of dormant connections may be 200. The number of dormant connections, however, cannot be excessive because each dormant connection represents a pending response that could be received from a service provider system and need to be processed at any time. In this embodiment of the invention, global counters are used during the process described in FIGS. 2A, 2B, and 2C to keep track of the current number of active and dormant connections on the server.

Referring again to block 204, if the maximum number of concurrent connections for the server has been reached, the process continues at block 206 where a resource unavailable exception is thrown to avoid overloading the server with a new connection, and then a failed customer interaction message is returned to the data channel at block 208. If the maximum number of concurrent connections for the server has not been reached, the process continues at block 210 where a global active counter for the server is incremented to reflect the fact that the transaction request will now be processed at block 212 and then sent to the appropriate service provider system. After the transaction request has been processed by the server, the global active counter is decremented at block 214, and the global dormant counter is incremented at block 216 to reflect the fact that a response to the transaction request is currently pending.

As discussed previously, an adapter represents a particular combination of connection attributes. Each adapter has a maximum number of concurrent connections that it can handle effectively, which is determined through performance testing. In this embodiment of the invention, a dormant counter is used to keep track of the current number of dormant connections to an adapter. At block 218, the dormant counter for the current adapter is retrieved. Using the dormant counter, a determination is made at block 220 whether the current number of concurrent connections for the adapter is greater than or equal to a maximum number of concurrent connections allowed for the adapter. If the maximum number of concurrent connections for the adapter has been reached, the process continues at block 221 where the global dormant counter is decremented to reflect the fact that the transaction request could not be sent to the appropriate service provider system; therefore, a response is not pending and will not be received from the service provider system. The process continues at block 206 where a resource unavailable exception is thrown, and then a failed customer interaction message is returned to the data channel at block 208. If the maximum number of concurrent connections for the adapter has not been reached, the process continues in FIG. 2B at block 222.

In order to sustain a high throughput, the service provider system response times must be low. Therefore, in this embodiment of the invention, a "sliding timer" is used to assure that the response time will be low in terms of a success or failure to deliver a response in a timely fashion. The term "sliding timer" is used herein in its broadest sense to describe the altering of the allocated time for a service provider system to respond. A low response time is made effective through a reduction in the available time given to a service provider system to respond to a transaction request as the number of concurrent requests to the same service provider system increases. In this embodiment of the invention, each adapter has a current dormant counter that keeps track of the count of dormant connections accessing the service provider system. That count is used to calculate a timeout value assigned to the next connection used to access the same service provider system. As the used connection count increases, the timeout value granted to the next connection requested is decreased proportionally. This reduction in available time is throttled by a "soft factor" which is configurable for each adapter. The soft factor is composed of a maximum timeout value, a minimum timeout value, and a slide factor. In this embodiment of the invention, the following algorithm is used to calculate the timeout value:

$$\text{Timeout} = \text{Maximum} - (\text{Current}/\text{Sliding Factor})$$

Maximum represents the maximum number of concurrent connections for an adapter, and Current represents the current number of concurrent connections for an adapter. The calculation of the timeout value for the current transaction is shown in FIG. 2B at block 222.

To illustrate the calculation of the timeout value using the algorithm above, if the maximum number of concurrent connections for an adapter is 12, and the sliding factor is 1, the timeout will start at 12 seconds and slide down 1 second for every concurrent connection until it gets to 1 second. If the maximum number of concurrent connections for an adapter is 12, and the sliding factor is 2, the timeout will start at 12 seconds and slide down 1 second for every 2 concurrent connections until it gets to 1 second. If the service provider system requires more than the calculated timeout value to respond, the transaction request is timed out and a resource unavailable exception is thrown resulting in the return of a failed customer interaction message.

In alternative embodiments of the invention, more than one algorithm may be used to calculate the timeout value. For example, the sliding factor may be used to determine the rate at which the timeout value will be decreased. If the sliding factor is greater than zero, the algorithm above is used. If the sliding factor is less than zero, the following algorithm is used to calculate the timeout value:

$$\text{Timeout} = \text{Maximum} - (\text{Current} * \text{Sliding Factor} * -1)$$

Maximum represents the maximum number of concurrent connections for an adapter, and Current represents the current number of concurrent connections for an adapter. This algorithm will result in the timeout value decreasing rapidly as the current number of concurrent connections for an adapter increases. If the sliding factor equals zero, the timeout value will be equal to the maximum timeout value, which is used to turn off the sliding timer. Each new concurrent connection will get the maximum timeout value regardless of the current number of concurrent connections. As would be easily understood by one skilled in the art, one or more algorithms may be used to calculate the timeout value, and any number of computations using a wide variety of variables may be used to achieve the desired results.

The process continues at block 224 where the dormant counter is incremented for the adapter to reflect that a new concurrent connection is about to be created. At block 226, a new thread is spawned to the appropriate service provider system thereby creating a new concurrent connection to the adapter. The thread is a light-weight thread process that is assigned the timeout value calculated at block 222. The timeout value indicates when the light-weight thread process should return if a response has not been received from the service provider system. A call is then made to the service provider system with the new thread at block 228, and control is then passed to the light-weight thread process.

A determination is made at block 230 whether the timeout value assigned to the thread has timed out. If the thread times out, the transaction request is rejected and a resource unavailable exception is thrown at block 232 resulting in a failed customer interaction message being returned to the data channel at block 234. Since a response was not received from the service provider system to the transaction request before the thread timed out, the process will wait at block 236 until the response is received. When a response is received, it is discarded and the process continues at block 238 where the dormant counter for the adapter is decremented to reflect the fact that a concurrent connection on the adapter has ended. The global dormant counter is then decremented at block 240 to reflect the fact that a response to the transaction request is no longer pending from the service provider system.

If a response is received from the service provider system before the thread times out at block 230, the process continues at block 242 in FIG. 2C. If the response is received, the dormant counter for the adapter is decremented at block 244 to reflect the fact that a concurrent connection on the adapter has ended, and the global dormant counter is decremented at block 246 to reflect the fact that a response is no longer pending to the transaction request. The global active counter is then incremented at block 248 while the response is processed by the middleware at block 250. The response from the service provider system to the transaction request is then returned to the data channel at block 252, and the global active counter is decremented at block 254 to reflect the fact that the transaction has been completed.

The terminology used herein is for the purpose of describing particular embodiments only and is not intended to limit the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof. Additionally, comparative, quantitative terms such as "above," "below," "less," and "greater," are intended to encompass the concept of equality; thus, "less" can mean not only "less" in the strictest mathematical sense, but also "less than or equal to."

Although specific embodiments have been illustrated and described herein, those of ordinary skill in the art will appreciate that any arrangement which is calculated to achieve the same purpose may be substituted for the specific embodiments shown and that the invention has other applications in other environments. This application is intended to cover any adaptations or variations of the present invention. The following claims are in no way intended to limit the scope of the invention to the specific embodiments described herein.

We claim:

1. A method for monitoring and regulating concurrent connections in a network, wherein the network comprises at least one server and a plurality of service provider systems, the method comprising:

receiving, by a processor, a transaction request from a data channel related to a service provider system;

determining, by the processor, if the current connections with a server is greater than a maximum number of the current connections allowed for the server;

incrementing, by the processor, a global active counter for the server reflecting that the transaction request is going to be processed when the current connections is less than the maximum number of the current connections for the server, and providing a resource unavailable notification when the current connections is greater than the maximum number of current connections;

processing, by the processor, the transaction request by sending the transaction request to the service provider system;

decrementing, by the processor, the global active counter for the server when the transaction request is processed;

incrementing, by the processor, a global dormant counter for the server reflecting a response to the transaction request is pending;

determining, by the processor, if the current connections with an adapter is greater than a maximum number of current connections allowed for the adapter, wherein the adapter is a combination of attributes that comprises at least the service provider;

incrementing, by the processor, a dormant counter for the adapter when the current connections is less than the maximum number of the current connections for the adapter reflecting that a new concurrent connection is being created, and providing the resource unavailable notification when the current connections is greater than the maximum number of current connections;

accessing, by the processor, the service provider system associated with the transaction request with a new connection including a thread, wherein the thread comprises a timeout value and controls the new connection to the service provider system;

determining, by the processor, if a response is received from the service provider before the thread times out;

decrementing, by the processor, the dormant counter for the adapter reflecting that the new connection has ended and decrementing the global dormant counter reflecting that the response to the transaction request is no longer pending when the response from the service provider is received before the thread is timed out reflecting that a current connection on the adapter has ended, and providing the resource unavailable notification when the thread times out before the response is received;

incrementing, by the processor, the global active counter reflecting that the response is being processed;

processing, by the processor, the response from the service provider system;

returning, by the processor, the response from the service provider system to the data channel that initiated the transaction request; and decrementing, by the processor, the global active counter indicating that the transaction request is completed.

2. The method of claim 1 wherein the timeout value is calculated based at least in part on the current number of concurrent connections for the adapter and a maximum number of concurrent connections for the adapter.

3. The method of claim 1 wherein providing the resource unavailable notification comprises responding that the transaction request has malfunctioned.

4. The method of claim 1 wherein the maximum number of concurrent connections to the at least one server comprises a maximum number of active connections to the at least one server and a maximum number of dormant connections to the at least one server.

5. The method of claim 1, wherein the data channel is an ATM machine that initiates the transaction request.

6. The method of claim 1, wherein the data channel is a computing device that initiates the transaction request.

7. The method of claim 6, wherein the computing device initiates the transaction request when a bank customer uses a banking website.

8. The method of claim 6, wherein the computing device initiates the transaction request when a bank customer service representative responds to a customer request.

9. The method of claim 1, wherein the data channel is a telephone that initiates the transaction request.

10. A computer program product for monitoring and regulating concurrent connections in a network, wherein the network comprises at least one server and a plurality of service provider systems, wherein the computer program product comprises a non-transitory computer readable medium, wherein the non-transitory computer readable medium comprises computer executable program code that, when executed by a computer, causes the computer to:

receive a transaction request from a data channel related to a service provider system;

determine if the current connections with a server is greater than a maximum number of the current connections allowed for the server;

increment a global active counter for the server reflecting that the transaction request is going to be processed when the current connections is less than the maximum number of the current connections for the server, and provide a resource unavailable notification when the current connections is greater than the maximum number of current connections;

process the transaction request by sending the transaction request to the service provider decrement the global active counter for the server when the transaction request is processed;

increment a global dormant counter for the server reflecting a response to the transaction request is pending;

determine if the current connections with an adapter is greater than a maximum number of current connections allowed for the adapter, wherein the adapter is a combination of attributes that comprises at least the service provider;

increment a dormant counter for the adapter when the current connections is less than the maximum number of the current connections for the adapter reflecting that a new concurrent connection is being created, and provide the resource unavailable notification when the current connections is greater than the maximum number of current connections;

access the service provider system associated with the transaction request with a new connection including a thread, wherein the thread comprises a timeout value and controls the new connection to the service provider system;

determine if a response is received from the service provider before the thread times out; decrement the dormant counter for the adapter reflecting that the new connection has ended and decrement the global dormant counter reflecting that the response to the transaction request is no longer pending when the response from the service provider is received before the thread is timed out reflecting that a current connection on the adapter has ended, and provide the resource unavailable notification when the thread times out before the response is received; increment the global active counter reflecting that the response is being processed; process the response from the service provider system;

return the response from the service provider system to the data channel that initiated the transaction request; and decrement the global active counter indicating that the transaction request is completed.

11. The computer program product of claim 10 wherein the computer executable program code causes the computer to calculate the timeout value based at least in part on the current number of concurrent connections for the adapter and a maximum number of concurrent connections for the adapter.

12. The computer program product of claim 10 wherein the computer executable program code for providing the resource unavailable notification causes the computer to respond that the transaction request has malfunctioned.

13. The computer program product of claim 10 wherein the maximum number of concurrent connections to the at least one server comprises a maximum number of active connections to the at least one server and a maximum number of dormant connections to the at least one server.

14. An apparatus comprising memory and a processor configured to execute a process for monitoring and regulating concurrent connections in a network, wherein the network comprises at least one server and a plurality of service provider systems, the process comprising:

receiving a transaction request from a data channel related to a service provider system;

determining if the current connections with a server is greater than a maximum number of the current connections allowed for the server;

incrementing a global active counter for the server reflecting that the transaction request is going to be processed when the current connections is less than the maximum number of the current connections for the server and providing a resource unavailable notification when the current connections is greater than the maximum number of current connections;

processing the transaction request by sending the transaction request to the service provider system;

decrementing the global active counter for the server when the transaction request is processed;

incrementing a global dormant counter for the server reflecting a response to the transaction request is pending;

determining if the current connections with an adapter is greater than a maximum number of current connections allowed for the adapter, wherein the adapter is a combination of attributes that comprises at least the service provider;

incrementing a dormant counter for the adapter when the current connections is less than the maximum number of the current connections for the adapter reflecting that a new concurrent connection is being created and providing the resource unavailable notification when the current connections is greater than the maximum number of current connections;

accessing the service provider system associated with the transaction request with a new connection including a thread, wherein the thread comprises a timeout value and controls the new connection to the service provider system;

determining if a response is received from the service provider before the thread times out;

decrementing the dormant counter for the adapter reflecting that the new connection has ended and decrementing the global dormant counter reflecting that the response to the transaction request is no longer pending when the response from the service provider is received before the thread is timed out reflecting that a current connection on the adapter has ended and providing the resource unavailable notification when the thread times out before the response is received;

incrementing the global active counter reflecting that the response is being processed;

processing the response from the service provider system;

returning the response from the service provider system to the data channel that initiated the transaction request; and decrementing the global active counter indicating that the transaction request is completed.

15. The apparatus of claim 14 wherein the timeout value is calculated based at least in part on the current number of concurrent connections for the adapter and a maximum number of concurrent connections for the adapter.

16. The apparatus of claim 14 wherein providing the resource notification comprises responding that the transaction request has malfunctioned.

17. A system for monitoring and regulating concurrent connections in a network, the system comprising: at least one server configured to connect to at least one data channel, wherein each connection between the at least one server and the at least one data channel is one of a plurality of concurrent connections;

at least one execution system configured to execute and respond to transaction requests, wherein each transaction request creates a concurrent connection between an execution system and a server that is one of the plurality of concurrent connections; and a processing system in communication with the execution system and configured to:

receive a transaction request from a data channel related to a service provider determine if the current connections with a server is greater than a maximum number of the current connections allowed for the server;

increment a global active counter for the server reflecting that the transaction request is going to be processed when the current connections is less than the maximum number of the current connections for the server, and provide a resource unavailable notification when the current connections is greater than the maximum number of current connections;

process the transaction request by sending the transaction request to the service provider system;

decrement the global active counter for the server when the transaction request is processed;

increment a global dormant counter for the server reflecting a response to the transaction request is pending;

determine if the current connections with an adapter is greater than a maximum number of current connections allowed for the adapter, wherein the adapter is a combination of attributes that comprises at least the service provider;

increment a dormant counter for the adapter when the current connections is less than the maximum number of the current connections for the adapter reflecting that a new concurrent connection is being created, and provide the resource unavailable notification when the current connections is greater than the maximum number of current connections;

access the service provider system associated with the transaction request with a new connection including a thread, wherein the thread comprises a timeout value and controls the new connection to the service provider system;

determine if a response is received from the service provider before the thread times out;

decrement the dormant counter for the adapter reflecting that the new connection has ended and decrement the global dormant counter reflecting that the response to the transaction request is no longer pending when the response from the service provider is received before the thread is timed out reflecting that a current connection on the adapter has ended, and provide the resource unavailable notification when the thread times out before the response is received;

increment the global active counter reflecting that the response is being processed;

process the response from the service provider system;

return the response from the service provider system to the data channel that initiated the transaction request; and decrement the global active counter indicating that the transaction request is completed.

18. The system of claim 17 wherein the processing system calculates the timeout value based at least in part on the current number of concurrent connections in the first group and a maximum number of concurrent connections for the first group.

19. The system of claim 17 wherein providing the resource unavailable notification comprises responding that the transaction request has malfunctioned.

20. The system of claim 17, wherein the at least one execution system comprises a computing device configured to run a bank software application.

21. The system of claim 17, wherein the at least one data channel comprises a device configured to initiate a transaction request.

22. The system of claim 21, wherein the device configured to initiate the transaction request is an ATM machine.

23. The system of claim 21, wherein the device configured to initiate the transaction request is a computing device.

24. The system of claim 21, wherein the device configured to initiate the transaction request is a telephone.

25. A method for identifying a problem in a network, wherein the network comprises at least one server, a plurality of service provider systems, a plurality of concurrent connections, wherein each connection in the plurality of concurrent connection connects a data channel to a server, or the server to one of the plurality of service provider systems, the method comprising:
- receiving, by a processor, a transaction request from a data channel related to a service provider system;
- determining, by the processor, if the current connections with a server is greater than a maximum number of the current connections allowed for the server;
- incrementing, by the processor, a global active counter for the server reflecting that the transaction request is going to be processed when the current connections is less than the maximum number of the current connections for the server and providing a resource unavailable notification when the current connections is greater than the maximum number of current connections;
- processing, by the processor, the transaction request by sending the transaction request to the service provider system;
- decrementing, by the processor, the global active counter for the server when the transaction request is processed;
- incrementing, by the processor, a global dormant counter for the server reflecting a response to the transaction request is pending;
- determining, by the processor, if the current connections with an adapter is greater than a maximum number of current connections allowed for the adapter, wherein the adapter is a combination of attributes that comprises at least the service provider;
- incrementing, by the processor, a dormant counter for the adapter when the current connections is less than the maximum number of the current connections for the adapter reflecting that a new concurrent connection is being created and providing the resource unavailable notification when the current connections is greater than the maximum number of current connections;
- accessing, by the processor, the service provider system associated with the transaction request with a new connection including a thread, wherein the thread comprises a timeout value and controls the new connection to the service provider system;
- determining, by the processor, if a response is received from the service provider before the thread times out;
- decrementing, by the processor, the dormant counter for the adapter reflecting that the new connection has ended and decrementing the global dormant counter reflecting that the response to the transaction request is no longer pending when the response from the service provider is received before the thread is timed out reflecting that a current connection on the adapter has ended and providing the resource unavailable notification when the thread times out before the response is received;
- incrementing, by the processor, the global active counter reflecting that the response is being processed;
- processing, by the processor, the response from the service provider system;
- returning, by the processor, the response from the service provider system to the data channel that initiated the transaction request; and
- decrementing, by the processor, the global active counter indicating that the transaction request is completed.

26. The method of claim 25, further comprising identifying a problem in the network by determining which of one or more connection attributes in the plurality of concurrent connections are unique.

* * * * *